US008226203B2

(12) United States Patent
Noguchi

(10) Patent No.: US 8,226,203 B2
(45) Date of Patent: Jul. 24, 2012

(54) TAPE FOR LIQUID DISCHARGE HEAD AND LIQUID DISCHARGE HEAD

(75) Inventor: Mitsutoshi Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 12/272,283

(22) Filed: Nov. 17, 2008

(65) Prior Publication Data

US 2009/0142592 A1 Jun. 4, 2009

(30) Foreign Application Priority Data

Nov. 30, 2007 (JP) ................................ 2007-310920

(51) Int. Cl.
*B41J 2/015* (2006.01)
*B32B 7/12* (2006.01)

(52) U.S. Cl. .................................... 347/20; 428/355 EP

(58) Field of Classification Search ............ 428/355 EP; 347/20
See application file for complete search history.

(56) References Cited

U.S. PATENT DOCUMENTS

| | | | | |
|---|---|---|---|---|
| 4,536,524 | A * | 8/1985 | Hart et al. | 523/176 |
| 5,198,524 | A * | 3/1993 | Bush et al. | 528/87 |
| 5,262,802 | A | 11/1993 | Karita et al. | |
| 2007/0064059 | A1 * | 3/2007 | Inamoto et al. | 347/64 |
| 2007/0139467 | A1 * | 6/2007 | Kihara et al. | 347/40 |
| 2009/0234072 | A1 * | 9/2009 | Nakagawa et al. | 525/100 |

FOREIGN PATENT DOCUMENTS

| | | | |
|---|---|---|---|
| JP | 2004-284284 | | 10/2004 |
| WO | WO 2007029733 | A1 * | 3/2007 |

OTHER PUBLICATIONS

English translation of JP 2004-284284.

* cited by examiner

*Primary Examiner* — Hai Vo

(74) *Attorney, Agent, or Firm* — Fitzpatrick, Cella, Harper & Scinto

(57) ABSTRACT

A liquid discharge head comprises a discharge port member provided with a discharge port to discharge a liquid and a tape having an adhesive layer comprising an adhesive, which tape adheres to a surface having the discharge port of the discharge port member so that the discharge port is sealed through the adhesive layer. The adhesive contains a compound having at least one of an epoxy group and an oxetanyl group and a compound having a ketimine group.

4 Claims, 4 Drawing Sheets

TAPE FOR LIQUID DISCHARGE HEAD AND LIQUID DISCHARGE HEAD

BACKGROUND OF THE INVENTION

1. Field of the Invention

The present invention relates to a tape to be used for a liquid discharge head that discharges a liquid, and a liquid discharge head having the tape.

2. Description of the Related Art

An ink jet printing method by which an ink is discharged toward a printed medium for printing can be exemplified as a use of a liquid discharge head that discharges a liquid.

An ink jet print head to be applied for the ink jet printing method (a liquid jet recording method) includes in general a plurality of minute discharge ports, liquid channels and energy generating elements placed partially at the liquid channels to generate energy required for discharging the liquid.

The discharge ports of the ink jet print head are left open to the air during use in order to discharge ink. While during non-use, a surface of the ink jet print head, where the discharge ports are aligned, is capped to prevent clogging of the discharge port caused by evaporation of an ink solvent from the discharge port, or damages caused by a contact of paper, etc. In case an ink jet print head is mounted on an apparatus such as a printer, the head can be protected by capping by means of a capping mechanism of the printer. However, in case an ink jet print head is not mounted on an apparatus, especially in a distribution stage, other protective countermeasure is required against the evaporation of the ink solvent and damages by a contact. To this end protection of the surface having the ink discharge port formed with an adhesive tape has been carried out as disclosed in U.S. Pat. No. 5,262,802.

In case an adhesive tape is used for protecting an ink jet print head, debris of the adhesive may be generated by peeling. It has been known that the adhesive debris, especially in the vicinity of the ink discharge port, may cause unevenness in wettability around the ink discharge port, which leads to a deviated flight direction of an ink droplet. Further it has been known that the adhesive debris may move to a discharge port to cause clogging of the same by a recovery operation after the head is mounted on an apparatus. To cope with this, a technique that a protective member having a peelable adhesiveness is bonded without contacting the adhesive with the vicinity of the ink discharge port, so as to decrease the adhesive debris in the vicinity of the ink discharge port, is disclosed by Japanese Patent Application Laid-Open No. 2004-284284.

However, when the adhesiveness in the vicinity of the discharge port is decreased to inhibit generation of the adhesive debris, very high accuracy positioning is required to decrease the adhesiveness only in the vicinity of the ink discharge port. A very expensive apparatus is required therefor, and there are many difficulties in exercising the same. If the adhesiveness is decreased alternatively for a broader area around the ink discharge port, sealing of the ink discharge port may become incomplete. In this case, the effect on prevention of evaporation of the ink solvent may be compromised, or the tape may be detached from the ink jet print head in a distribution stage.

SUMMARY OF THE INVENTION

The present invention has been made in view of such existing problems. An object of the present invention is to provide a tape, which can protect a surface of a member having a discharge port formed until the start of using an ink jet print head, and leaves least debris of the adhesive in the vicinity of a discharge port when the tape is peeled off, and to provide an ink jet print head having the tape.

An exemplary liquid discharge head of the present invention includes a discharge port to discharge a liquid; and a tape having an adhesive layer comprising an adhesive, which tape adheres to a component having the discharge port so that the discharge port is sealed by the adhesive layer; wherein the adhesive contains a compound having a polymerizable group and a compound that reacts with the liquid to provide the polymerizable group with a substance which functions as a polymerization initiator.

The present invention can provide a tape, which can protect a surface of a member having a discharge port formed until the start of using an ink jet print head, and leaves least debris of the adhesive in the vicinity of a discharge port when the tape is peeled off, as well as an ink jet print head having the tape.

Further features of the present invention will become apparent from the following description of exemplary embodiments with reference to the attached drawings.

DESCRIPTION OF THE EMBODIMENTS

Figure 1A:
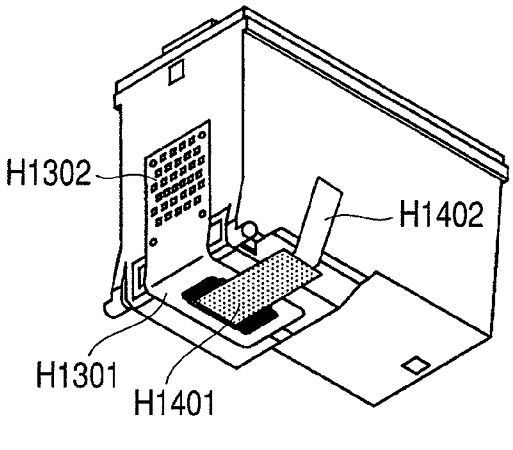
FIGS. 1A and 1B are perspective views illustrating an embodiment of the ink jet print head of the present invention.

Referring to the drawings, an exemplary embodiment of the present invention will be described below.

In the drawings the same reference numeral is used to designate components having the same function, and a repetition of a description may be omitted in the description hereinbelow.

A liquid discharge head can be mounted on an apparatus, such as a printer, a copier, a facsimile having a communication system, and a word-processor with a printing unit, or an industrial printing apparatus combined with other various processing apparatus. Printing can be conducted using the liquid discharge head on various record media, such as paper, thread, fiber, cloth, leather, metal, plastic, glass, wood and ceramic. "Printing" means herein not only to affix an image with a specific meaning, such as a character and a figure, onto a record medium, but also to affix an image without a specific meaning such as a pattern.

An ink jet print head will be described hereinbelow as an example of the liquid discharge head.

An exemplary embodiment of the present invention will be described below in reference to the drawings.

Figure 1B:
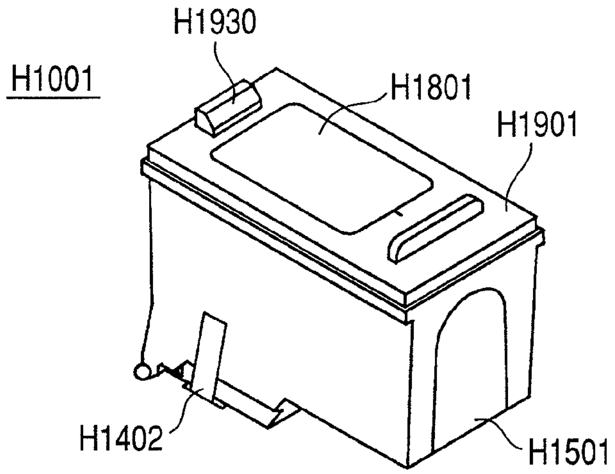

FIGS. 1A and 1B illustrate an example of the ink jet print head according to the present invention. The ink jet print head H1001 is integrated with an ink tank in which ink is filled. A tape H1401 for protecting discharge ports adheres to a surface of a discharge port member having the discharge ports formed, covering at least the discharge ports. Namely, FIGS.

1A and 1B illustrate the ink jet print head in a distribution stage, which discharge ports are sealed with the tape H1401.

By the embodiment illustrated by FIGS. 1A and 1B, a printing element board H1101 and the ink tank are integrated with the ink jet print head, which may be called as an ink jet print head cartridge. The present invention is also applicable to an ink jet print head, with which a printing element board H1101 and an ink tank are not integrated.

Figure 2A:
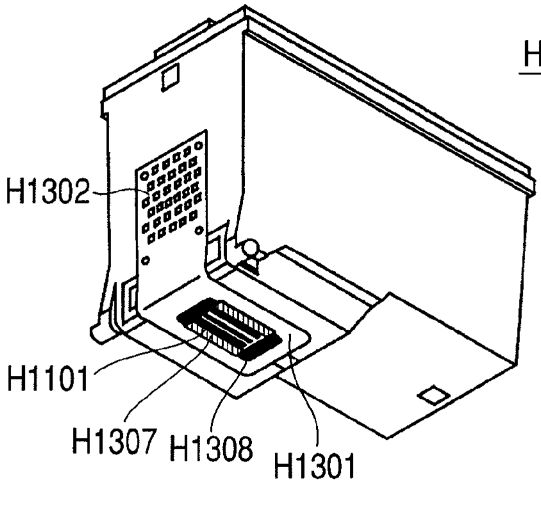
FIGS. 2A and 2B are schematic perspective views illustrating an embodiment of the ink jet print head of the present invention in a form of a cartridge without application of the tape.
Figure 2B:
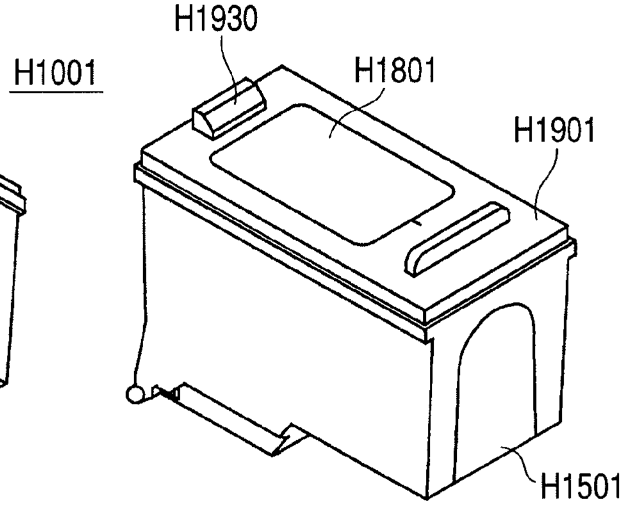
Figure 3A:
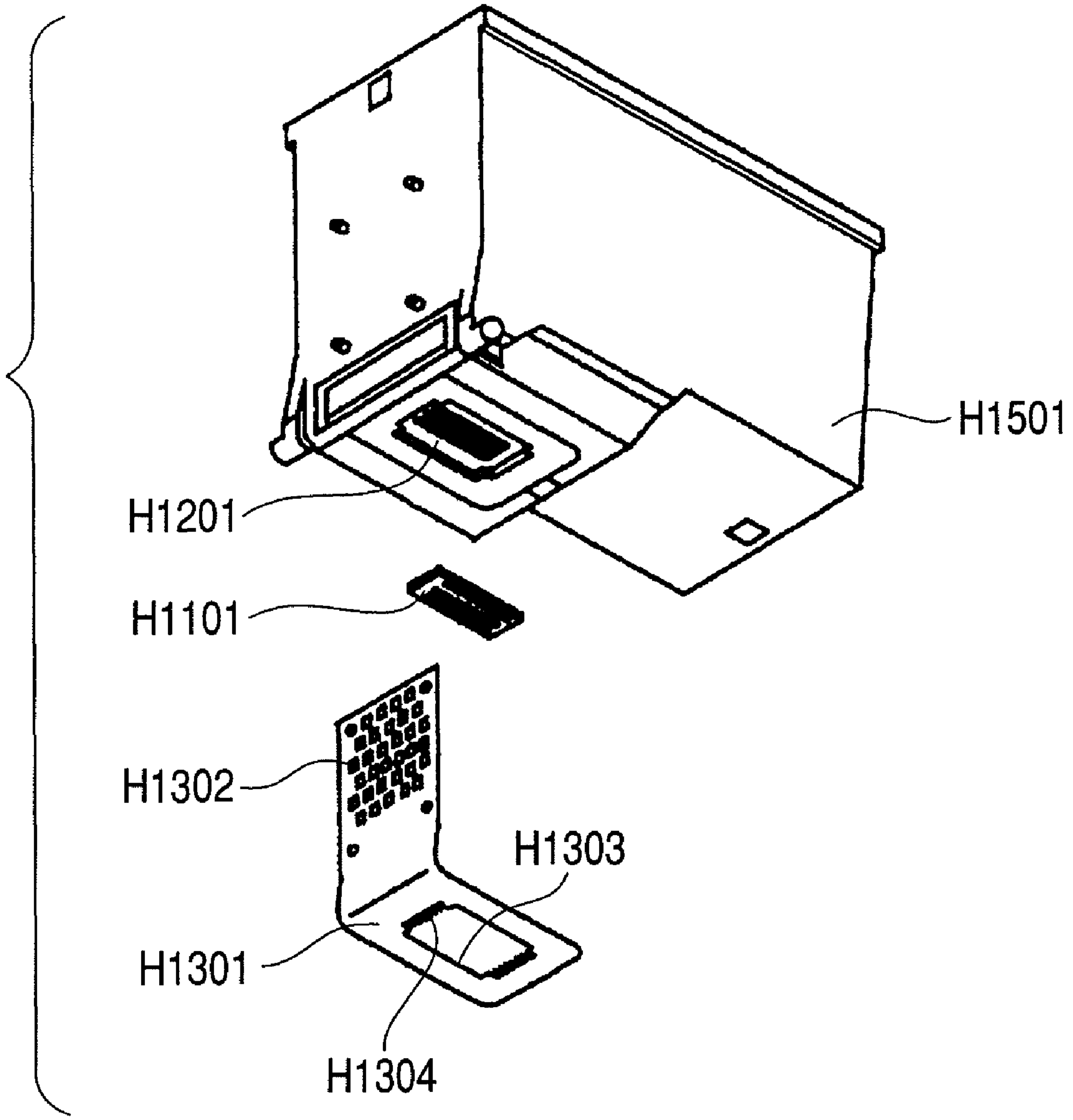
FIGS. 3A and 3B are schematic exploded perspective views illustrating an example of the ink jet print head illustrated by FIGS. 2A and 2B.
Figure 3B:
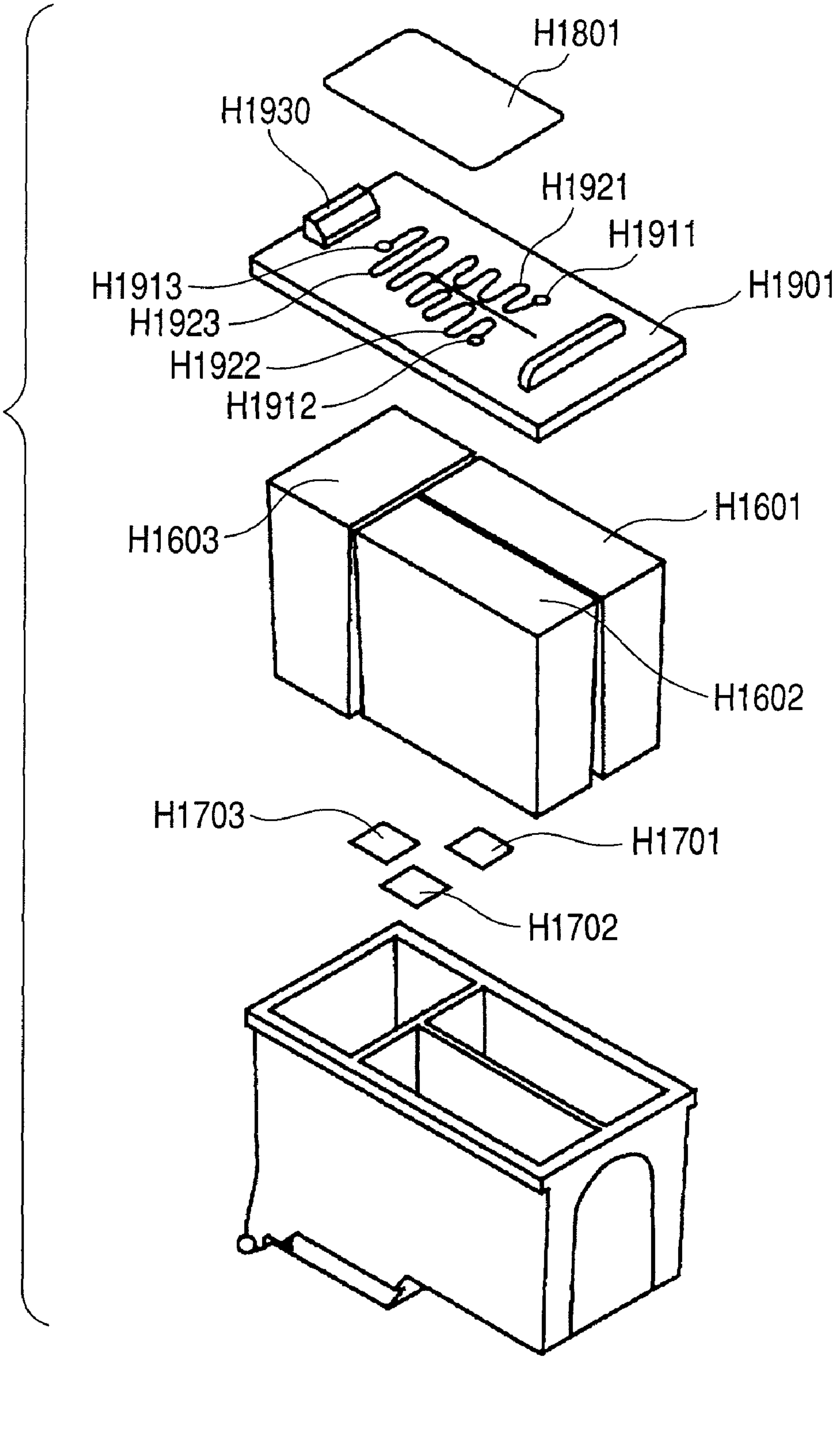
Figure 4A:
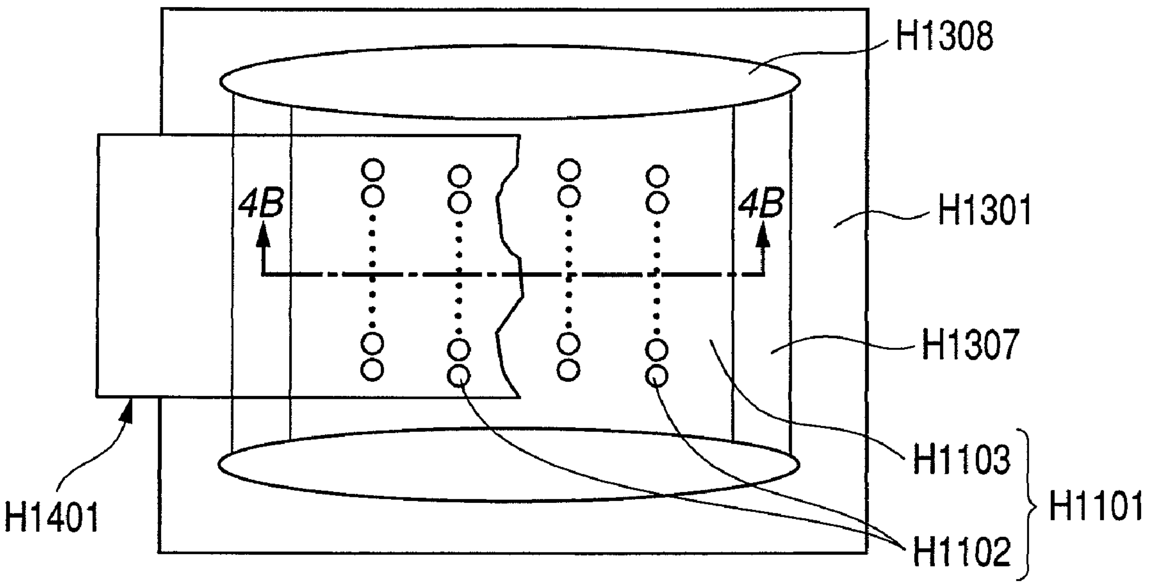
FIGS. 4A and 4B are schematic views illustrating a part of an example of the ink jet print head of the present invention.
Figure 4B:
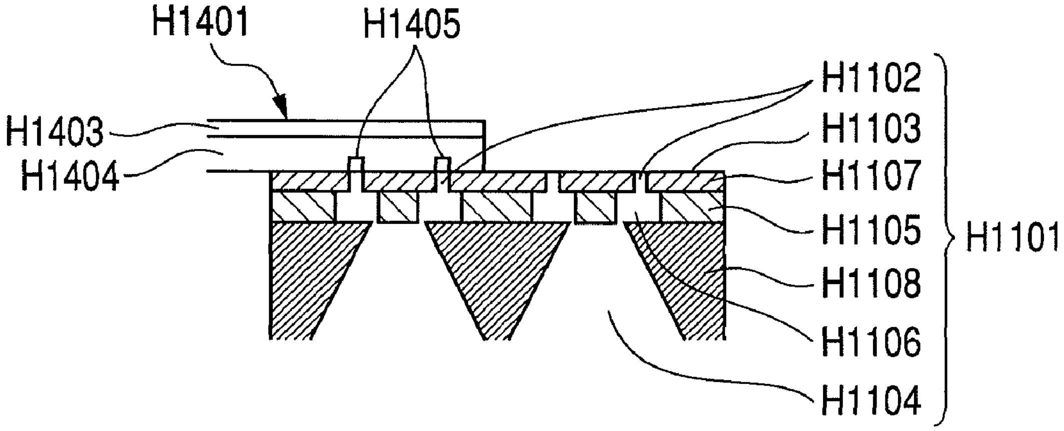

FIGS. 2A and 2B are perspective views illustrating the constitution of the ink jet print head H1001, and FIGS. 3A and 3B are exploded perspective views thereof. The ink jet print head H1001 includes the printing element board H1101, an electrical wiring tape H1301, an ink supply holding member H1501, filters H1701 to H1703, ink absorbers H1601 to H1603 and a lid member H1901. Out of the ink supply holding member H1501 and the lid member H1901 a housing of an ink-containing member are formed to contain the filters H1701 to H1703 and the ink absorbers H1601 to H1603. As illustrated in FIGS. 4A and 4B, ink supply ports H1104 are formed in the printing element board H1101 by sandblasting or anisotropic etching. Further on the printing element board H1101 ink flow paths and discharge ports H1102 are provided by a photolithography process.

The electrical wiring tape H1301 is formed by forming copper wiring on a polyimide film to form a path for transmitting electrical signals for discharging the ink to the printing element board H1101.

The ink supply holding member H1501 is formed by a resin molding and mounted with the printing element board H1101 and the electrical wiring tape H1301. The ink absorbers H1601 to H1603 utilizing compressed polypropylene (PP) fibers to hold the ink and generate a negative pressure, and are inserted into an internal space formed in the ink supply holding member H1501. At a jointing part of the ink supply holding member H1501 and the ink absorbers H1601 to H1603 forming ink flow paths, the filters H1701 to H1703 are attached in advance to prevent entry of dust to the printing element board H1101. The lid member H1901 is welded over the upper opening of the ink supply holding member H1501.

In the distribution stage, the tape H1401 for protecting the discharge ports and a tag tape H1402 as an aid for peeling the tape H1401 are bonded as illustrated in FIGS. 1A and 1B. Since the discharge ports are sealed with the tape H1401, not only the discharge ports H1102 are guarded, but also leakage of the ink though the discharge ports by fluctuation of pressure or temperature during distribution can be protected. The tape H1401 has an adhesive layer comprising an adhesive, and adheres to the member provided with the discharge port, so that the discharge ports is sealed through the adhesive layer.

A cause of generation of debris in the vicinity of a discharge port, when the tape is peeled off from the member having the discharge port formed therein, is attributable to cohesive fracture of the adhesive by peeling due to the increased adhesion strength.

Another cause of the adhesive debris is attributable to the viscoelasticity of the adhesive, due to which the adhesive flows and enters into the ink discharge port in the distribution stage. The entered adhesive in the ink discharge port tends to cause cohesive fracture when peeled off, which would lead to inferior printing due to the reason described above. Consequently, increase of the elastic modulus of the adhesive in the vicinity of the discharge port can be an effective solution thereto.

Under such circumstances, the present inventors have intensively studied to discover that the adhesion strength of the adhesive in the vicinity of the discharge port can be decreased and the elastic modulus thereof can be increased by using such an adhesive as can react with a component in the ink to form a cross-linked structure, thereby completing the present invention.

FIG. 4A is a schematic view illustrating the vicinity of the discharge port surface of an exemplary ink jet print head of the present invention, and FIG. 4B is a schematic cross-sectional view illustrating the central part of FIG. 4A. The printing element board H1101 includes a board H1108 in which ink supply ports H1104 are formed. On the board H1108 an ink flow path member H1105 forming ink flow paths H1106, and a discharge port member H1107 provided with discharge ports H1102 placed on the ink flow path member are assembled. A path from the ink supply ports H1104, through the ink flow paths H1106, and to the discharge ports H1102 is communicated with an ink tank and the ink is present in the path. In case an ink tank and the printing element board H1101 are not integrated, in the path from the ink supply ports H1104, through the ink flow paths H1106, and to the discharge ports H1102, a liquid for the distribution period different from the ink for discharging may be present.

A tape H1401 which adheres to the surface provided with the discharge ports H1102 of the discharge port member H1107 includes a tape substrate H1403 and an adhesive layer H1404. Such part (H1405) of the adhesive layer H1404 as corresponds to the discharge ports H1102 is a part contacting the ink, and a low adhesion strength region H1405.

The adhesive forming the adhesive layer H1404 includes at least a compound having a cross-linking group and a precursory curing agent that reacts with a component in the ink to form a curing agent reactive with the compound having the cross-linking group. Consequently when the ink contacts the adhesive layer H1404, the adhesive reacts with the component in the ink to initiate a cross-linking reaction. As a result, the part H1405 corresponding to the discharge ports H1102 contains cross-linked cross-linking groups in the adhesive component. Thereby it is not necessary that all of the cross-linking groups are cross-linked. In case a main polymer including an epoxy group or an oxetanyl group as a cross-linking group as described below is used for the adhesive, the part H1405 contains a cross-linked epoxy group or oxetanyl group.

A compound that can form a cross-linked structure by a cross-linking reaction initiated by the curing agent generated by the reaction of the precursory curing agent with a component in the ink may be used as the compound having a cross-linking group. As the "cross-linking group", polymerizable groups such as an epoxy group and an oxetanyl group may be exemplified. The compound having a cross-linking group is preferably a polymer component which is a main component in the adhesive, for example an adhesive material. Specific examples of a usable compound include an acrylic resin, a rubber type polymer, and a silicone resin, having an epoxy group or an oxetanyl group.

As an acrylic resin usable as a main polymer, a resin containing a copolymer of an alkyl (meth)acrylate as a main component may be exemplified. As a usable rubber type polymer, a polymer containing natural rubber, polyisobutylene, styrene-butadiene rubber, and styrene-isoprene rubber as a main component may be exemplified. As a usable silicone resin, a resin containing a silicone rubber or a silicone resin having as a main component an organo-polysiloxane may be exemplified.

The compound that is a main component in the adhesive having the cross-linking group in the structure may be produced as below. When an acrylic resin, a rubber type polymer or a silicone resin is used as a main polymer, the main polymer is prepared with a monomer component therefor and a monomer component having the cross-linking group, thereby the monomer component having the cross-linking group being used preferably in the range of 1 to 50% by weight with respect to the total monomer amount.

As a precursory curing agent may be used a compound that provides, by virtue of a reaction with the liquid, a substance functioning as a polymerization initiator for the polymerizable group. In case the liquid is ink, a compound that reacts with a component in the ink becoming a curing agent reactive with the compound having the cross-linking group, may be used. When the ink contacts the adhesive layer H1404, the precursory curing agent reacts with a component in the ink (e.g. water) to become a curing agent, which initiates a cross-linking reaction with the compound having a cross-linking group (more specifically with the cross-linking group contained in the compound). Due to the cross-linked structure formed by this reaction, the adhesion is weakened and the elastic modulus is increased at the part H1405, where the reaction has taken place. Consequently, when the tape of the present invention is peeled off from the component surface forming the discharge ports, the adhesive debris is not generated. As the precursory curing agent, a compound in which a reactive group of a curing agent is inactivated by chemical protection, and the reactive group can be reactivated through a reaction with a component in the ink, may be used.

In addition to the above, as the precursory curing agent of the present invention, a microcapsule of a curing agent reactive to cross-link with a compound having the cross-linking group encapsulated by a compound soluble in a component in the ink, may be also used. As the compound soluble in a component in the ink (e.g. water), a water-soluble resin such as polyvinyl alcohol may be exemplified. Microencapsulation may be carried out according to a publicly known method.

As the “component in the ink”, any publicly known component in the ink may be used. For example, in case of a water-based ink, the component is water. Since a water-based ink is most broadly used, the component in the ink according to the present invention may be preferably water.

Furthermore, the adhesive of the present invention may contain a main polymer including a compound having the cross-linking group as a constituent thereof and imparting adhesiveness to the adhesive, and the precursory curing agent. In this case the compound having the cross-linking group is included as a constituent in the structure of the main polymer, and the cross-linking group in the main polymer and a curing agent generated from the precursory curing agent initiate a cross-linking reaction.

In case the component in the ink is water, a ketimine compound may be exemplified as the precursory curing agent. A ketimine compound of the present invention is a compound of a polyamine-type curing agent whose active hydrogen is inactivated by protection with a ketone. A ketimine group is represented by the following general formula (1). The ketimine compound of the present invention has two or more ketimine groups and is able to form a cross-linked structure.

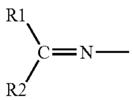

(1)

wherein R1 and R2, the same or different, are a hydrocarbon group containing a linear chain, a branched chain, an alicyclic ring or an aromatic ring.

A ketimine group reacts with water to form an active primary amino group according to the following formula (2)

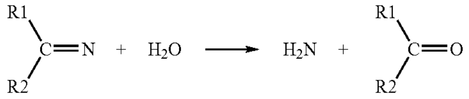

(2)

wherein R1 and R2 have the same meanings as above.

Consequently, a ketimine compound (a precursory curing agent) reacts rapidly with water (a component in the ink) in the ink to form a curing agent (a polyamine-type curing agent) having a primary amine functional group, and the formed curing agent and a compound having a cross-linking group form a cross-linked structure. In case the compound having a cross-linking group is an epoxy resin, the epoxy resin and the formed curing agent having an amino group react to cross-link forming a cross-linked structure. Furthermore, if a compound having a cross-linking group is a constituent of the main polymer, the cross-linking group existing in the main polymer and the formed curing agent (a polyamine-type curing agent) react to cross-link, so that the main polymer and the formed curing agent form a cross-linked structure.

A ketimine compound can be obtained, for example, by reacting a polyamine compound having a primary amino group (a polyamine-type curing agent) with a carbonyl compound to block (ketiminization) the primary amino group in the polyamine compound. The source polyamine compound having a primary amino group may be any of an aliphatic, an alicyclic or an aromatic type, and the molecular weight is in general 5,000 or less, preferably in the range of 50 to 2,000 from the view point of good handling due to a lower viscosity. The number of the primary amino group is two or more per molecule.

The polyamine compound is represented by the following formula (3)

$$R_3\text{-}(NH_2)_n \qquad (3)$$

wherein the n represents an integer 2 or higher. In other words, the polyamine compound includes two or more primary amino groups in a molecule.

Examples of the polyamine compound include an aliphatic polyamine, an alicyclic polyamine, an aromatic polyamine, an araliphatic polyamine and a heterocyclic polyamine.

Examples of an aliphatic polyamine include aliphatic diamines, such as ethylenediamine, 1,3-trimethylenediamine, 1,4-tetramethylenediamine, 1,3-pentamethylenediamine, 1,5-pentamethylenediamine, 1,6-hexamethylenediamine, 1,2-propylenediamine, 1,2-butylenediamine, 2,3-butylenediamine, 1,3-butylenediamine, 2-methyl-1,5-pentamethylenediamine, 3-methyl-1,5-pentamethylenediamine, 2,4,4-trimethyl-1,6-hexamethylenediamine, and 2,2,4-trimethyl-1,6-hexamethylenediamine; diethylenetriamine; triethylenetetramine; tetraethylenepentamine and pentaethylenehexamine. Further, a polyamine having a polyoxyalkylene backbone such as a diamine having a polyoxyalkylene backbone may be used as an aliphatic polyamine.

Examples of an alicyclic polyamine include alicyclic diamines, such as 1,3-cyclopentanediamine, 1,4-cyclohexanediamine, 1,3-cyclohexanediamine, 1-amino-3-aminomethyl-3,5,5-trimethylcyclohexane, 1-amino-1-methyl-4-aminomethylcyclohexane, 1-amino-1-methyl-3-aminomethylcyclohexane, 4,4-methylenebis(cyclohexylamine), 4,4'-methylenebis(3-methylcyclohexylamine), methyl-2,3-cyclohexanediamine, methyl-2,4-cyclohexanediamine, methyl-2,6-cyclohexanediamine, 1,3-bis(aminomethyl)cyclohexane, 1,4-bis(aminomethyl)cyclohexane, isophoronediamine, and norbornanediamine (e.g. 2,5-bis(aminomethyl)bicyclo[2.2.1]heptane and 2,6-bis(aminomethyl)bicyclo[2.2.1]heptane).

Examples of an aromatic polyamine include aromatic diamines, such as m-phenylenediamine, p-phenylenediamine, 2,4-tolylenediamine, 2,6-tolylenediamine, naphthylene-1,4-diamine, naphthylene-1,5-diamine, 4,4'-diphenyldiamine, 4,4'-diphenylmethanediamine, 2,4'-diphenylmethanediamine, 4,4'-diphenyl ether diamine, 2-nitrodiphenyl-4,4'-diamine, 2,2'-diphenylpropane-4,4'-diamine, 3,3'-dimethyldiphenylmethane-4,4'-diamine, 4,4'-diphenylpropanediamine, and 3,3'-dimethoxydiphenyl-4,4'-diamine.

Examples of an araliphatic polyamine include araliphatic diamines, such as 1,3-xylylenediamine, 1,4-xylylenediamine, α,α,α', α'-tetramethyl-1,3-xylylenediamine, α,α,α', α-tetramethyl-1,4-xylylenediamine, ωω'-diamino-1,4-diethylbenzene, 1,3-bis(1-amino-1-methylethyl)benzene, 1,4-bis(1-amino-1-methylethyl)benzene, and 1,3-bis(α,α-dimethylaminomethyl)benzene.

Another example is a polyamideamine having an amino group at a molecular end of the polyamide.

A carbonyl compound to block a primary amino group of the polyamine compound is represented by the following formula (4)

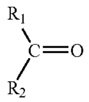

(4)

wherein R1 and R2, the same or different, are a hydrocarbon group containing a linear chain, a branched chain, an alicyclic ring or an aromatic ring.

Specific examples of a hydrocarbon group include a linear or branched alkyl group having 1 to about 20 carbon atoms, such as a methyl group, an ethyl group, a propyl group, an isopropyl group, a butyl group, an isobutyl group, a s-butyl group, and a t-butyl group.

Specific examples of an aromatic hydrocarbon group include an aryl group such as a phenyl group, and a naphthyl group.

Furthermore, R1 and R2 may join together to form a 3 to about 20-membered cycloalkane ring, such as a cyclopropane ring, a cyclobutane ring, a cyclopentane ring, and a cyclohexane ring. For example, general ketone compounds, such as acetone, methyl ethyl ketone, methyl isopropyl ketone, methyl isobutyl ketone, diethyl ketone, dipropyl ketone, cyclohexanone, methylcyclohexanone, methyl cyclohexyl ketone, acetophenone, and benzophenone, can be used favorably.

Ketiminization may be performed, for example, by mixing a polyamine compound and a carbonyl compound in an equivalent ratio or in excess of the carbonyl compound and stirring the mixture at room temperature or on heating removing the generated water by azeotropic distillation from the system. In the above reaction, a solvent, such as toluene and xylene, may be also used.

Examples of a ketimine compound that is obtained according to the above method and applicable to the present invention are represented by the formulas (5) to (16) listed below.

Examples of a polyamine compound to be used include ethylenediamine, trimethylenediamine, tetramethylenediamine, pentamethylenediamine, hexamethylenediamine, diethylenetriamine, norbornanediamine, xylylenediamine, bis(aminocyclohexyl)methane, bis(aminomethyl)cyclohexane, and polyoxyalkylenediamine. Cases with hexamethylenediamine, diethylenetriamine, bis(aminocyclohexyl)methane, and bis(aminomethyl)cyclohexane are described below.

Examples of a carbonyl compound to be used include acetone, methyl ethyl ketone, diethyl ketone, methyl isobutyl ketone, and diisobutyl ketone. Cases with acetone, methyl ethyl ketone, and methyl isobutyl ketone are described below.

(5)

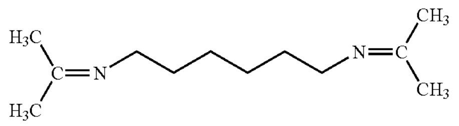

(6)

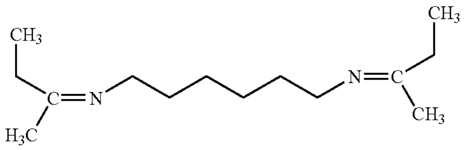

(7)

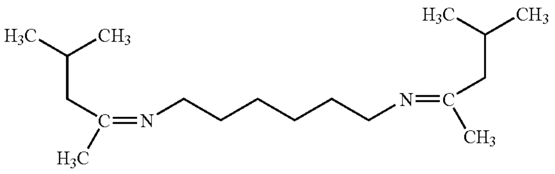

(8)

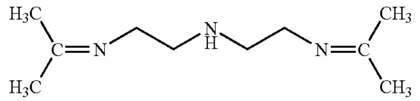

(9)

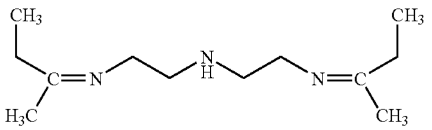

(10)

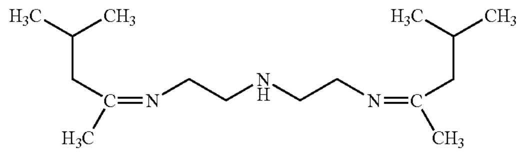

(11)

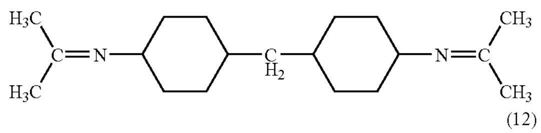

(12)

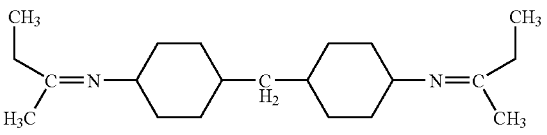

-continued (13)

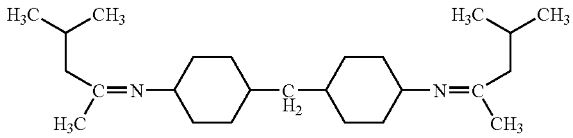

(14)

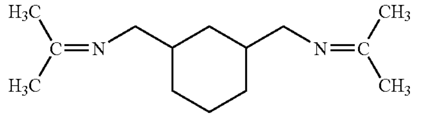

(15)

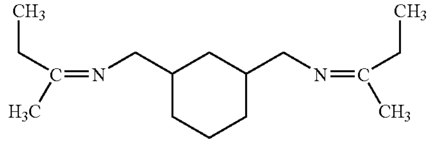

(16)

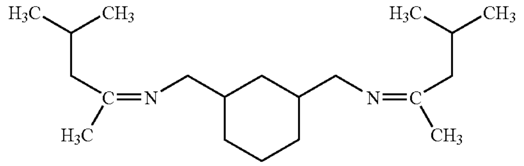

Some of the ketimine compounds are commercially available, and examples thereof include Epicure H-3, Epicure H-30 (both are trade names of Japan Epoxy Resins Co., Ltd.) and Adeka Hardner EH-235R Series (a trade name of Adeka Corporation).

It is preferable to adjust an amount of the precursory curing agent in the adhesive, so that the primary amino group generated from the precursory curing agent should become equivalent to the cross-linking group of the compound having the cross-linking group.

On the other hand, the adhesive of the present invention may contain a compound having the cross-linking group, a precursory curing agent and a main polymer imparting the adhesiveness to the adhesive. Namely, the compound having the cross-linking group and the main polymer are different compounds, and the cross-linking group in the compound having the cross-linking group and the curing agent generated from the precursory curing agent react to cross-link. Furthermore, the compound having the cross-linking group may be present independently, or present in the structure of a conventional additive (i.e. the additive functions as a compound having the cross-linking group) In this case, for example, an epoxy resin may be selected as a compound having the cross-linking group, and the ketimine compound may be selected as a precursory curing agent.

The adhesive of the present invention may contain appropriately publicly known additives suitable for an individual adhesive.

As a material for a tape substrate H1403 of the tape of the present invention, any material that can provide a function of a sealing tape can be used, and a film of a resin, such as polyethylene terephthalate, polyester and polyimide, may be exemplified.

The tape substrate surface, on which an adhesive is coated (the surface contacting a chip surface) may be subjected to a commonly used surface treatment, such as a plasma treatment and a corona discharge treatment, to improve the adhesion with the adhesive.

The thickness of the tape substrate may be, for example, between 7 and 75 μm, and preferably between 12 and 30 μm.

The thickness of the adhesive layer may be, for example, between 5 and 50 μm, and preferably between 10 and 40 μm.

The respective components will be described in more detail below.

The present invention will be described more specifically by means of Examples.

EXAMPLE 1

A mixture of a silicone rubber and a silicone resin, containing organopolysiloxane as main components was used as the main polymer of the adhesive of the tape for the liquid discharge head of Example 1. The weight average molecular weight of the silicone rubber was 700,000. The silicone resin contained epoxy groups in the structure whose epoxy equivalent was 2,000. In other words, in this Example, the main polymer contained as a component a compound having epoxy groups as the cross-linking group. Additionally benzoyl peroxide was added as a cross-linking agent for the main polymer.

A ketimine compound of H-30 (a trade name of Japan Epoxy Resins Co., Ltd.) was added so that the amount of the primary amino group formed from the ketimine compound became equivalent to the epoxy group in the main polymer.

The adhesive containing such compounds was prepared.

The prepared adhesive was coated on a 25 μm-thick polyethylene terephthalate film to obtain a tape with a 30 μm-thick adhesive layer.

EXAMPLE 2

A mixture of a silicone rubber and a silicone resin, containing organopolysiloxane as main components was used as the main polymer of the adhesive of the tape for the liquid discharge head of Example 2. The weight average molecular weight of the silicone rubber was 700,000. The silicone resin contained oxetanyl groups in the structure whose oxetane equivalent was 2,000.

Additionally benzoyl peroxide was added as a cross-linking agent for the main polymer.

Further, a ketimine compound of H-30 (a trade name of Japan Epoxy Resins Co., Ltd.) was added so that the amount of the primary amino group formed from the ketimine compound became equivalent to the oxetanyl group in the main polymer.

The adhesive containing such compounds was prepared.

The prepared adhesive was coated on a 25 μm-thick polyethylene terephthalate film to obtain a tape with a 30 μm-thick adhesive layer.

EXAMPLES 3 TO 6

According to the compositions in the following table were prepared the respective reaction solutions for the main polymers of the adhesives for the tapes for the liquid discharge head of Examples 3 to 6.

| | Content (part by weight) | | | |
|---|---|---|---|---|
| Component | Example 3 | Example 4 | Example 5 | Example 6 |
| butyl acrylate | 70 | 70 | 70 | 70 |
| methyl acrylate | 27 | 26 | 23 | 18 |

-continued

| | Content (part by weight) | | | |
|---|---|---|---|---|
| Component | Example 3 | Example 4 | Example 5 | Example 6 |
| glycidyl methacrylate | 1 | 2 | 5 | 10 |
| acrylic acid | 2 | 2 | 2 | 2 |
| ethyl acetate | 150 | 150 | 150 | 150 |

Next, 0.3 parts of azobisisobutyronitrile was added and the mixture was polymerized under the nitrogen atmosphere at 70° C. for 6 hours. After the reaction, the reaction solution was adjusted to a solid content of 25% by adding methyl isobutyl ketone to obtain the main polymer solution. The weight average molecular weights of the synthesized acrylic polymers were 1,000,000.

To the main polymer solution 2 parts by weight of aluminum tris(acetylacetonate) with respect to 100 parts by weight of the main polymer was added as a cross-linking agent. A ketimine compound of H-30 (a trade name of Japan Epoxy Resins Co., Ltd.) was also added so that the amount of the primary amino group to be formed from the ketimine compound became equivalent to the epoxy group in the main polymer.

The adhesive containing such compounds was prepared.

The prepared adhesive was coated on a 25 μm-thick polyethylene terephthalate film to obtain a tape with a 30 μm-thick adhesive layer.

EXAMPLES 7 TO 9

According to the composition in the following table was prepared the reaction solution for the main polymer of the adhesives for the tapes for the liquid discharge head of Examples 7 to 9.

| Component | Content (part by weight) |
|---|---|
| butyl acrylate | 75 |
| methyl acrylate | 23 |
| acrylic acid | 2 |
| ethyl acetate | 150 |

Next, 0.3 parts of azobisisobutyronitrile was added and the mixture was polymerized under the nitrogen atmosphere at 70° C. for 6 hours. After the reaction, the reaction solution was adjusted to a solid content of 25% by adding methyl isobutyl ketone to obtain a main polymer solution. The weight average molecular weight of the synthesized acrylic polymer was 1,000,000.

To the main polymer solution Epicoat 828 (a trade name of Japan Epoxy Resins Co., Ltd.) was added as an epoxy compound according to the compositions in the following table.

| | Content (part by weight) | | |
|---|---|---|---|
| Component | Example 7 | Example 8 | Example 9 |
| Main polymer (as solid) | 100 | 100 | 100 |
| Epicoat 828 | 1 | 5 | 10 |

Next, to the solution 2 parts by weight of aluminum tris (acetylacetonate) with respect to 100 parts by weight of the main polymer was added as a cross-linking agent.

Further, a ketimine compound of H-30 (a trade name of Japan Epoxy Resins Co., Ltd.) was added so that the amount of the primary amino group formed from the ketimine compound became equivalent to the epoxy group in the main polymer, to which the epoxy compound had been added.

The adhesive containing such compounds was prepared.

The prepared adhesive was coated on a 25 μm-thick polyethylene terephthalate film to obtain a tape with a 30 μm-thick adhesive layer.

COMPARATIVE EXAMPLE 1

A mixture of a silicone rubber and a silicone resin, containing organopolysiloxane as main components was used as the main polymer of the adhesive of the tape for the liquid discharge head of Comparative Example 1. The weight average molecular weight of the silicone rubber was 700,000. The silicone resin contained an epoxy group in the structure whose epoxy equivalent was 2,000.

The adhesive containing such compounds further including benzoyl peroxide as a cross-linking agent for the main polymer was prepared.

The prepared adhesive was coated on a 25 μm-thick polyethylene terephthalate film to obtain a tape with a 30 μm-thick adhesive layer.

COMPARATIVE EXAMPLE 2

According to the composition in the following table was prepared the reaction solution for the main polymer of the adhesive for the tape for the liquid discharge head of Comparative Example 2.

| Component | Content (part by weight) |
|---|---|
| butyl acrylate | 65 |
| methyl acrylate | 33 |
| acrylic acid | 2 |
| ethyl acetate | 150 |

Next, 0.3 parts of azobisisobutyronitrile was added and the mixture was polymerized under the nitrogen atmosphere at 70° C. for 6 hours. After the reaction, the reaction solution was adjusted to a solid content of 25% by adding methyl isobutyl ketone to obtain the main polymer solution. The weight average molecular weight of the synthesized acrylic polymer was 1,000,000.

To the main polymer solution was added as a cross-linking agent 10 parts by weight of hexamethylene diisocyanate with respect to 100 parts by weight of the main polymer to prepare the adhesive.

The prepared adhesive was coated on a 25 μm-thick polyethylene terephthalate film to obtain a tape with a 30 μm-thick adhesive layer.

(Evaluation and Comparison)

Evaluation methods are described below.

The respective tapes prepared according to Examples 1 to 9 and Comparative Examples were cut to the desired sizes and applied to the discharge port surface (the chip surface) of the ink jet print head H1001 as described above. The ink jet print head was designed to discharge a 2 pL-volume of ink, and the diameter of the discharge port was 10 μmΦ.

The ink jet print head, whose discharge port was thus sealed, was packaged and subjected to a heat test at 70° C. With respect to the tapes of Examples 1 and 2, and Comparative Example 1, there occurred no leakage to confirm that the sealing capabilities thereof were sufficient.

The evaluation results of a print test, an observation of the discharge port surface and an adhesion strength test are described in Table 1.

Thereafter the tape was peeled off and a print test was conducted. With the ink jet print head sealed with the tape of Example 1 or 2, there was no deviated landing of the ink and clean print was obtained. On the other hand, with the ink jet print head sealed with the tape of Comparative Example 1, there occurred deviated landing of the ink and clean print could not be obtained.

By observing the vicinity of the discharge port under a scanning electron microscopy, an adhesive debris was not recognized in the vicinity of the discharge port with respect to the ink jet print head sealed with the tape of Examples 1 to 9. On the other hand, with respect to the ink jet print head sealed with the tape of Comparative Example 1 or 2, generation of an adhesive debris in the vicinity of the discharge port was confirmed. In Table 1 the rating A denotes that an adhesive debris was not recognized, B denotes that a small amount of an adhesive debris was recognized, and C denotes that a large amount of an adhesive debris was recognized.

The adhesion strength was measured at a part without ink contact and a part with ink contact respectively for each tape to confirm that the adhesion strength was decreased at the part with ink contact in comparison to the part without ink contact in case of Examples 1 to 9. A presumable reason therefor is that the adhesive at the part with ink contact was cured by the water in the ink and the adhesion strength was decreased.

Further, another presumable reason for the decrease in an adhesive debris by Examples 1 to 9 in comparison to Comparative Examples, is that the coherent fracture of the adhesive induced by an ink component was suppressed by the curing of the adhesive caused by the reaction with the water in the ink.

TABLE 1

| | Print quality | Observation result of discharge port surface | Adhesion strength [N/m] Part without water contact | Part with water contact |
|---|---|---|---|---|
| Example 1 | A | A | 214 | 14 |
| Example 2 | A | A | 206 | 23 |
| Example 3 | A | A | 194 | 12 |
| Example 4 | A | A | 190 | 10 |
| Example 5 | A | A | 181 | 8 |
| Example 6 | A | A | 182 | 7 |
| Example 7 | A | A | 200 | 10 |
| Example 8 | A | A | 185 | 12 |
| Example 9 | A | A | 180 | 8 |
| Comparative Example 1 | C | B to C | 230 | 244 |
| Comparative Example 2 | C | C | 210 | 215 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-310920, filed Nov. 30, 2007, which is hereby incorporated by reference herein its entirety.

What is claimed is:

1. An ink discharge head comprising:

a discharge port member provided with a discharge port to discharge the ink; and a tape having an adhesive layer comprising an adhesive, which adheres to a surface having the discharge port of the discharge port member so that the discharge port is sealed by the adhesive layer, wherein the adhesive contains a compound having at least one of an epoxy group and an oxetanyl group, and a compound having a ketimine group which is microcapsulated by a resin soluble by water contained in the ink, wherein a curing agent, generated by reacting the ketimine group with water contained in the ink, promotes a cross-linking reaction with the compound having at least one of the epoxy group and the oxetanyl group, and wherein the tape is adhered to the surface, and adhesion strength of the adhesive of the tape adhered to the surface is less at an area in the vicinity of the discharge port due to the cross-linking reaction than at an area other than the area in the vicinity of the discharge port.

2. The ink discharge head according to claim 1, wherein the adhesive comprises an acrylic resin having an epoxy group.

3. The ink discharge head according to claim 1, wherein the adhesive comprises a silicone resin having an epoxy group.

4. The ink discharge head according to claim 1, wherein the adhesive contains a compound having an epoxy group, and wherein the compound having a ketimine group forms a primary amine by reacting with water contained in the ink.

* * * * *